No. 740,372. Patented September 29, 1903.

UNITED STATES PATENT OFFICE.

CHARLES ROGERS, OF KEW, VICTORIA, AUSTRALIA, ASSIGNOR OF TWO-THIRDS TO ALICE MARY OSWALD, OF CAULFIELD, VICTORIA, AUSTRALIA.

PROCESS OF EXTRACTING ZINC FROM SULFID ORES, &c.

SPECIFICATION forming part of Letters Patent No. 740,372, dated September 29, 1903.

Application filed October 21, 1901. Serial No. 79,460. (No specimens.)

*To all whom it may concern:*

Be it known that I, CHARLES ROGERS, manufacturing chemist, a subject of the King of Great Britain, residing at and whose post-office address is 24 Gellibrand street, Kew, in the State of Victoria and Commonwealth of Australia, have invented Improved Processes for the Extraction and Recovery of Zinc from Sulfid Ores or Tailings, of which the following is a specification.

This invention relates to the treatment of what are commonly known as "refractory sulfid ores," and in particular to the tailings of the silver-lead-zinc ores of the character found at Broken Hill and elsewhere; and the object is to economically and efficiently extract and recover the zinc and leave the residue as a smeltable product.

In carrying the invention into practice the tailings or crushed raw ores are subjected to a sulfatizing roast for about two to three hours in order to partially convert the zinc sulfid to sulfate, which latter forms a sort of pellicle or coating around an inner particle of sulfid. The partially-roasted material is then discharged while hot into water, which disintegrates it and dissolves the soluble neutral zinc sulfate, while by agitation and elutriation or leaching in the ordinary manner the silica or mud is partially separated from the mineral. The water-leached tailings are then leached with a weak solution of sulfuric acid (say two per cent. to three per cent.) to get out the basic zinc sulfate, after which said tailings are subjected to a similar roast, as before. The leaching operation is repeated on the reroasted material, the resultant lixivia of the former leach being utilized for the purpose. Both operations may be again repeated until sufficient zinc has gone into solution, which materially reduces the bulk of the tailings and removes the sulfur, leaving practically a silver-lead product, which can be readily concentrated and smelted. The zinc-sulfate lixivium is tested, and the bulk of the zinc is then thrown down as a dense amorphous precipitate of white sulfid by a solution of polysulfid of calcium. The precipitant must not be added in excess of the zinc, and any zinc left in solution is not lost, as the liquor may be again used for leaching in the earlier part of the process. The precipitated zinc sulfid is pumped into a filter-press and there washed, then dried, and roasted in a reverberatory furnace to an oxid for use as a pigment, or it may be distilled to metallic zinc, as preferred. The polysulfid of calcium may be prepared by slaking one part of lime, (CaO,) adding same to one part of sulfur, grinding and mixing in a Chilian mill, then boiling in a cast-iron boiler, with ten parts of water to one of powder until the whole of the sulfur is dissolved, with occasional stirring. This takes about two hours, water being added from time to time to compensate for loss by evaporation. The bulk of the sulfur in the tailings, constituting, perhaps, over twenty per cent. of the tailings, and that in the acid and precipitant goes down with the zinc and can be recovered in the oxidizing of the latter by drawing same as sulfurous anhydrid from the furnace into a solution of calcium polysulfid, where it is precipitated and may be collected to make fresh precipitant, or the gas may be made into sulfuric acid in the well-known manner.

It will be observed that while being very efficient this process is most economical, inasmuch as in the first place the materials used are of the cheapest and are recovered for reuse, the cost of fuel is reduced to a minimum, while the zinc is obtained clean and pure and the residue left as a readily-smeltable product free from sulfur.

Having now particularly described and ascertained the nature of my said invention and in what manner the same is to be performed, I declare that what I claim is—

The process for the extraction and recovery of zinc from zinc-containing sulfid ores or tailings, which consists in subjecting the same to a partial sulfatizing roast, discharging the same while hot into water, leaching the same with said water and with dilute sulfuric acid, subjecting the leached ores or tailings to a second sulfatizing roast, releaching the same with the lixivium from the former leaching, and repeating said operations until sufficient zinc and sulfur are removed.

In testimony whereof I have hereunto set my hand in presence of two subscribing witnesses.

CHARLES ROGERS.

Witnesses:
EDWARD WATERS, Junr.,
WALTER SMYTHE BAYSTON.